United States Patent
Feng

(10) Patent No.: US 11,329,583 B2
(45) Date of Patent: May 10, 2022

(54) GENERALIZED FREQUENCY CONVERSION SYSTEM FOR STEAM TURBINE GENERATOR UNIT

(71) Applicant: Weizhong Feng, Shanghai (CN)

(72) Inventor: Weizhong Feng, Shanghai (CN)

( * ) Notice: Subject to any disclaimer, the term of this patent is extended or adjusted under 35 U.S.C. 154(b) by 0 days.

(21) Appl. No.: 17/118,086

(22) Filed: Dec. 10, 2020

(65) Prior Publication Data
US 2021/0167706 A1 Jun. 3, 2021

Related U.S. Application Data

(63) Continuation-in-part of application No. 16/093,564, filed as application No. PCT/CN2016/098827 on Sep. 13, 2016.

(30) Foreign Application Priority Data

Apr. 13, 2016 (CN) .......................... 201610228304.2
Apr. 13, 2016 (CN) .......................... 201620307455.2

(51) Int. Cl.
*H02P 9/42* (2006.01)
*H02P 9/06* (2006.01)
(Continued)

(52) U.S. Cl.
CPC ................. *H02P 9/42* (2013.01); *F01D 15/10* (2013.01); *F01D 15/12* (2013.01); *H02P 9/06* (2013.01);
(Continued)

(58) Field of Classification Search
CPC .......... H02P 9/42; H02P 9/06; H02P 2101/20; F01D 15/10; F01D 15/12; F05D 2220/766
See application file for complete search history.

(56) References Cited

U.S. PATENT DOCUMENTS

| 4,920,276 A | 4/1990 | Tateishi et al. |
| 9,810,102 B2 | 11/2017 | Eramaa et al. |

(Continued)

FOREIGN PATENT DOCUMENTS

| CN | 103352824 A | 10/2013 |
| CN | 103362770 A | 10/2013 |

(Continued)

OTHER PUBLICATIONS

PCT; App No. PCT/CN2016/098827; International Search Report and Written Opinion dated Dec. 29, 2016.

*Primary Examiner* — Viet P Nguyen
(74) *Attorney, Agent, or Firm* — Fitch, Even, Tabin & Flannery, LLP

(57) ABSTRACT

A generalized frequency conversion system for a steam turbine generator unit. The system comprises at least a variable speed steam turbine with an adjustable rotating speed, a water feeding pump, a variable frequency generator operating at a variable speed, a speed increasing gearbox with a fixed rotating speed ratio, a variable frequency bus and an auxiliary machine. With a change in load of the unit, parameters of steam entering the variable speed steam turbine and an extracted steam amount are adjusted (changed) accordingly, so that the rotating speed of the steam turbine changes accordingly. In this way, on one hand, the rotating speed of the water feeding pump is changed through the speed increasing gearbox; and on the other hand, the frequency of alternating current outputted by the variable frequency generator is changed. In the present invention, there is no need to additionally provide other types of frequency converters, and the system is simple, reliable, low in cost and high in efficiency.

7 Claims, 5 Drawing Sheets

(51) Int. Cl.
  *F01D 15/10*   (2006.01)
  *F01D 15/12*   (2006.01)
  *H02P 101/20*   (2015.01)

(52) U.S. Cl.
  CPC .... *F05D 2220/766* (2013.01); *H02P 2101/20* (2015.01)

(56) References Cited

U.S. PATENT DOCUMENTS

| | | |
|---|---|---|
| 2006/0283206 A1 | 12/2006 | Rasmussen et al. |
| 2010/0019717 A1 | 1/2010 | Bjerknes et al. |
| 2015/0218970 A1 | 8/2015 | Ahn |
| 2016/0356171 A1 | 12/2016 | Thet et al. |
| 2017/0175564 A1 | 6/2017 | Schlak |

FOREIGN PATENT DOCUMENTS

| | | |
|---|---|---|
| CN | 103397917 A | 11/2013 |
| CN | 103398005 A | 11/2013 |
| CN | 103997277 A | 8/2014 |
| CN | 203911829 U | 10/2014 |
| CN | 104329126 A | 2/2015 |
| CN | 102570504 B | 7/2015 |
| CN | 105098973 A | 11/2015 |
| CN | 105703676 A | 6/2016 |
| CN | 205647319 U | 10/2016 |

GENERALIZED FREQUENCY CONVERSION SYSTEM FOR STEAM TURBINE GENERATOR UNIT

FIELD OF THE INVENTION

The present invention relates to the field of steam turbine generator units, and in particular to a generalized frequency conversion system for a steam turbine generator unit.

DESCRIPTION OF THE PRIOR ART

During production of power plants, water is heated into steam in a boiler; and then the steam is used to drive a steam turbine to rotate, thereby driving a generator to rotate and finally converting chemical energy of fuel into electricity. In the process of power generation, a large number of rotating auxiliary machines such as pumps and fans provided in the power plants need to consume a large amount of electricity. At present, the general practice is to use a plant voltage transformer to draw part of the generated electricity for the use of plant auxiliary machines.

In engineering design of power plants, the capacity of auxiliary machines is usually selected according to a maximum demand plus a certain allowance, so the auxiliary machines in actual operation have a relatively large margin. However, when the auxiliary machines operating at a fixed speed do not operate at full load, especially at low load, their working efficiency will drop sharply, which causes a serious waste of electricity. If a variable frequency speed adjustment technology is adopted, a working point of the auxiliary machine can be enabled to be as close to a high efficiency area as possible, and the throttling loss of a fan baffle and a valve can be reduced to the maximum extent, the energy consumption of an equipment in operation can be greatly reduced, and the service life of the equipment can be prolonged. Taking a centrifugal fan as an example, according to the principle of fluid mechanics, shaft power is directly proportional to the third power of a rotating speed. When the required air volume is reduced and the rotating speed of the fan decreases, the power falls by the third power of the rotating speed. Therefore, the energy saving effect of variable-speed operation is very considerable. Nowadays, variable frequency speed adjustment technology is an important means to save energy and reduce emissions, improve process flow to improve product quality and improve the environment, and promote technological progress. Variable frequency speed adjustment is recognized as the most promising speed adjustment mode at home and abroad because of its excellent speed adjustment and starting and braking performance, high efficiency, high power factor and power saving effect, and other advantages. At present, power plants change motor frequencies of water pumps or fans mainly by adding frequency converters, thereby changing rotating speeds of the water pumps or the fans, improving their operating efficiencies, and achieving a purpose of energy saving and emission reduction.

Now the frequency conversion methods mainly include silicon-controlled rectifier frequency conversion, hydraulic coupling frequency conversion and magnetic coupling frequency conversion. Among the three frequency conversion methods, the hydraulic coupling frequency conversion has high power, low reliability and low cost, its efficiency is directly proportional to the first power of the rotating speed, and its adjustment precision is low. Magnetic coupling frequency conversion has high reliability and the highest cost, its efficiency is directly proportional to the square of the rotating speed, the efficiency is low when the rotating speed is low, and if a magnetic coupling device is additionally mounted, the mounting position of the motor or equipment needs to be changed and the original civil construction foundation needs to be removed. Silicon-controlled rectifier frequency conversion has the highest efficiency, its efficiency is not affected by load changes, its response is the fastest, and its adjustment precise is the highest. Among these three frequency conversion methods, the cost of silicon-controlled rectifier frequency conversion is in the middle. In terms of cost and efficiency, the silicon-controlled rectifier frequency conversion technology is widely used in power plants.

Because of the high reliability of the equipment required in power plants, the used rotating equipment such as a water circulating pump and a blower have a high power and high voltage level, so the requirement on the frequency converter used in power plants is also extremely high. At present, a frequency conversion equipment in power plants mainly adopts the silicon-controlled rectifier technology. However, the biggest disadvantage of the silicon-controlled rectifier technology is that the higher the voltage level is, the lower the reliability of the equipment is, the area occupied by the frequency conversion equipment is large, and its frequency conversion harmonic waves have influences on both the power grid and the motor. Therefore, in the power plants, the promotion and application of the silicon-controlled rectifier frequency conversion technology is relatively slow. With the development of technologies, some products have been able to better solve the above-mentioned problems at present, but the high price of these products hinders their further promotion.

For this, patent "ZL 201210006442.8" provides a frequency conversion main power supply system for a thermal power plant, which uses a separately arranged small variable speed steam turbine with adjustable rotating speed for operation to drive a variable frequency generator. By changing the rotating speed for operation of the small variable speed steam turbine, the frequency of alternating current output by the variable frequency generator is changed. This invention realizes that alternating current of required frequency can be obtained without using a frequency converter, thus achieving the purpose of energy saving. However, the shortcoming is that a small variable speed steam turbine and a variable frequency generator need to be additionally configured; besides, corresponding auxiliary equipment such as a condenser and an oil system, and a control system, an electrical system and the like need to be supportively provided.

Therefore, patent "ZL 201420245755.3" further provides a novel frequency conversion system for a thermal power plant, that is, a water feeding pump steam turbine is directly connected to a water feeding pump, and a variable frequency generator is indirectly connected through a gearbox, while the water feeding pump is driven through the water feeding pump steam turbine, the variable frequency generator is also driven, this also realizes the same effect of obtaining alternating current of required frequency without using other types of frequency converters, and all auxiliary supporting systems are combined into one. However, the shortcoming is that with the increasing capacity of the unit at present, the capacity of the water feeding pump itself is relatively large, if the variable frequency generator is further driven, the power will be relatively higher. Taking a 1000 MW unit as an example, the design power of the water feeding pump is about 38 MW and the rotating speed is generally 4500-5300 rpm, which together with the power of an auxiliary machine of the variable frequency generator lead to at least 53 MW for the power of the water feeding pump steam turbine. Moreover, the manufacturing process ability of a water feeding pump steam turbines is limited by factors such as cylinder structures and blade strength at present, especially by the high stress at the root of long blades caused by high centrifugal force under high-speed rotation, the length of the last-stage blades and the exhaust area of the steam turbine are limited, the exhaust pressure of the water feeding pump steam turbines under the rated working condition will be very high, and thus, not only the economy efficiency is poor, but also it is difficult to match the rotating speed of the water feeding pump.

In addition, thanks to the technological progress of gearboxes in recent years, the speed increasing gearboxes with fixed rotating speed ratios are not only reliable but also have very high efficiency in a wide load range. The transmission efficiency under rated conditions can reach up to about 99.5%, even under 40% load, the transmission efficiency is as high as 98.5%. And the price of this kind of gearbox is negligible compared to water feeding pumps or small steam turbines. For variable speed gearboxes with non-fixed rotating speed ratios, not only are they expensive, but their average operating efficiency is also very low. In a 40% to 100% load range, the transmission efficiency is only between 50% and 95%, and the loss is staggering. For example, the patent with a publication number CN 103352824 A provides a driving system and method for a main water feeding pump, wherein during a starting stage of a unit, the water feeding pump is driven by a motor; and during a normal operation stage of the unit, the water feeding pump is driven by a main steam turbine. Since the water feeding pump needs to operate at a variable speed according to the load of the unit, and the main steam turbine generator operates at an industrial frequency and cannot be adjusted in speed, in this patent, a variable speed gearbox is arranged between a fixed-rotating-speed steam turbine and a variable-rotating-speed water feeding pump. Compared with a gearbox with a fixed rotating speed ratio, a variable speed gearbox will bring a very large loss of efficiency and increase the energy consumption of the entire system. Therefore, it increases the burden of factory electricity, and the gain is not worth the loss.

Therefore, the present invention is devoted to developing a generalized frequency conversion system having the advantages of low cost, high reliability, high efficiency and simple operation.

SUMMARY OF THE INVENTION

In view of the above-mentioned shortcomings of the prior art, the purpose of the present invention is to provide a generalized frequency conversion system having the advantages of low cost, high reliability, high efficiency and simple operation.

The present invention provides a generalized frequency conversion system for a steam turbine generator unit. The system at least comprises a variable speed steam turbine with an adjustable rotating speed, a water feeding pump, a variable frequency generator operating at a variable speed, a speed increasing gearbox with a fixed rotating speed ratio, a variable frequency bus and an auxiliary machine; characterized in that the variable speed steam turbine is connected to the water feeding pump through the speed increasing gearbox to drive the water feeding pump; the variable speed steam turbine is connected to the variable frequency generator to drive the variable frequency generator to generate power; and the variable frequency generator is connected to a motor of the auxiliary machine through the variable frequency bus.

Further, the generalized frequency conversion system comprises a front pump which is directly connected to the variable frequency generator.

Further, the generalized frequency conversion system comprises an industrial frequency bus and an industrial frequency power supply, wherein the motor of the auxiliary machine is connected to the industrial frequency power supply through the industrial frequency bus.

Alternatively, the generalized frequency conversion system is characterized by further comprising a clutch system arranged between the variable speed steam turbine and the variable frequency generator.

Further, the clutch system can be a separate safety coupling, or a separate clutch or a combination of a safety coupling and a clutch.

Alternatively, the generalized frequency conversion system further comprises a corresponding voltage transformer, wherein the voltage transformer is arranged at the rear of an output end of the variable frequency generator.

Alternatively, the generalized frequency conversion system further comprises a switch and an industrial frequency bus, wherein the motor of the auxiliary machine is connected to the variable frequency bus through the switch; and the motor of the auxiliary machine is connected to the industrial frequency bus through the switch.

Alternatively, the number of the auxiliary machines is at least one.

The basic principle of a generalized frequency conversion system provided by the present invention is as follows: a variable speed steam turbine with an adjustable rotating speed is used to connect a speed increasing gearbox to drive a water feeding pump and to further drive a variable frequency generator, so as to adjust (change) parameters and an amount of steam entering the variable speed steam turbine according to a load variation of a unit, so that the rotating speed changes correspondingly, thus the frequency of alternating current output by the variable frequency generator is changed, the power supply frequency of motors of all auxiliary machines connected to the variable frequency bus is changed through the variable frequency bus, and finally, the rotating speed of rotating machines of the auxiliary machines is changed.

The auxiliary machine connected to the variable frequency bus can also be connected to the industrial frequency bus. Industrial frequency and variable frequency are switched to each other for a standby use. When the variable speed steam turbine or the variable frequency generator fails or is under other special working conditions, the auxiliary machine connected to the variable frequency bus can switch to the industrial frequency quickly, thus ensuring the safe operation of the unit.

It is also possible to further provide a clutch system between the variable speed steam turbine and the variable frequency generator. If a condition (such as when the variable frequency generator or its electrical equipment fails and thus it is required that the variable frequency generator must be shut down) occurs, the variable frequency generator can be disconnected directly through the clutch system to ensure the normal operation of the water feeding pump, thus ensuring the operation safety of the main steam turbine generator unit. The clutch system may be a separate safety coupling, or a separate clutch, or a combination of a safety coupling and a clutch.

In addition, a corresponding voltage transformer can be arranged at the rear of the output end of the variable frequency generator, so that the output voltage of the variable frequency generator, after voltage transformation, can meet the requirements of motors of all auxiliary machines at different voltage levels.

As the load of the unit changes, the frequency conversion system provides all auxiliary machines connected thereto with a frequency modulation power supply having an initially adjusted frequency. The adjustment structures on the auxiliary machines, such as valves, baffles, or movable blades of adjustable axial-flow fans, can be further fine-tuned to ensure that production requirements are met. For example, the power supply frequency at which the opening of the adjusting mechanism of the auxiliary machine is 95% of the largest adjustable opening is used as the frequency of the frequency modulation power supply.

The variable speed steam turbine of the present invention takes the steam extracted from the main steam turbine as a working steam source. In addition, a steam inlet valve can be further arranged at the front of the variable speed steam turbine of the present invention, so that the rotating speed of the variable speed steam turbine can be further precisely controlled through the valve while the load of the unit changes.

The generalized frequency conversion system provided by the present invention has the following advantages:

1. The generalized frequency conversion system of the present invention can obtain alternating current of a required frequency without using other types of frequency converters, thus greatly reducing the power consumption of the auxiliary machine connected to the variable frequency bus.

2. According to the feature that the rotating speed of the water feeding pump and the variable speed steam turbine synchronously varies with the load of the unit, the variable speed steam turbine used in the present invention drives both the water feeding pump and the variable frequency generator. Therefore, compared with the solution of patent "ZL 201210006442.8", the water feeding pump steam turbine is combined with the separately arranged variable speed steam turbine, and the correspondingly arranged auxiliary machine systems are combined into one, the system is greatly simplified and the investment is reduced. In addition, the capacity of the combined steam turbine is relatively increased, and the internal efficiency is improved accordingly.

3. Since the variable speed steam turbine of the present invention is connected to the water feeding pump through the speed increasing gearbox, compared with the solution of the patent "ZL 201420245755.3", on one hand, the rotating speed of the water feeding pump can be designed higher, the diameter of the pump becomes smaller, and thus the manufacturing cost of the water feeding pump can be reduced; the shell of the pump becomes thinner, and the start-up and load-changing adaptability is strong; on the other hand, the rotating speed of the variable speed steam turbine is relatively low, which overcomes the problem that it is difficult to match the rotating speeds of the variable speed steam turbine and of the water feeding pump; at the same time, the exhaust residual velocity loss of the variable speed steam turbine at a low rotating speed is also relatively low, so a higher internal efficiency can be obtained relatively; and besides, since longer last-stage blades can be used for the variable speed steam turbine at a low rotating speed, the exhaust area obtained is more adequate, and thus the exhaust pressure can be relatively lower, that is, the actual total enthalpy drop during the operation of the steam turbine is relatively large, and the economic benefit will be better.

4. The generalized frequency conversion system provided by the present invention comprises a front pump within the scope of the generalized frequency conversion system, wherein the front pump is directly connected to the variable speed steam turbine and the variable frequency generator. Variable rotating speed operation of the front pump can be realized without using any types of electronic power frequency converters, and at the same time, because mechanical driving itself is highly reliable, it can avoid problems, brought by a conventional "driving the front pump at an industrial frequency" mode, such as low operating efficiency under low load condition and high risk of electrical failure caused by industrial frequency driving itself. In addition, compared with a traditional shaft system in which a front pump and a steam turbine are connected (the traditional shaft system uses a high-rotating-speed steam turbine, so that the front pump cannot be directly connected to the high-rotating-speed steam turbine, and a reduction gearbox with a fixed rotating speed ratio is required between the two), because a variable speed steam turbine with a low rotating speed is used, the front pump can be directly connected to the variable speed steam turbine and the variable frequency generator. There is no need to use an additional reduction gearbox, which not only saves the investment in the reduction gearbox itself, but also avoids the efficiency loss of the reduction gearbox itself, thus improving the economy of the unit.

The concept, specific structure and resulting technical effect of the present invention are further described below in conjunction with the drawings to fully understand the object, features, and effects of the present invention.

DESCRIPTION OF REFERENCE SIGNS IN THE DRAWINGS

T: variable speed steam turbine; G: variable frequency generator; BFP: water feeding pump BP: front pump; GB: speed increasing gearbox; C: clutch system; Tr: dual-winding voltage transformer; Tr': three-winding voltage transformer; a: variable frequency bus; b: industrial frequency bus;

c: variable frequency bus; d: industrial frequency bus;

$1a, 2a, 3a, \ldots, na$: switch between auxiliary machine and variable frequency bus;

$1b, 2b, 3b, \ldots, nb$: switch between auxiliary machine and industrial frequency bus;

$1c, 2c, 3c, \ldots, nc$: switch between auxiliary machine and variable frequency bus;

$1d, 2d, 3d, \ldots, nd$: switch between auxiliary machine and industrial frequency bus;

$M_1, M_2, M_3, \ldots, M_n$: motor of auxiliary machine;

$M_1', M_2', M_3', \ldots, M_n'$: motor of auxiliary machine.

DETAILED DESCRIPTION OF THE PREFERRED EMBODIMENTS

Embodiment 1

Figure 1:
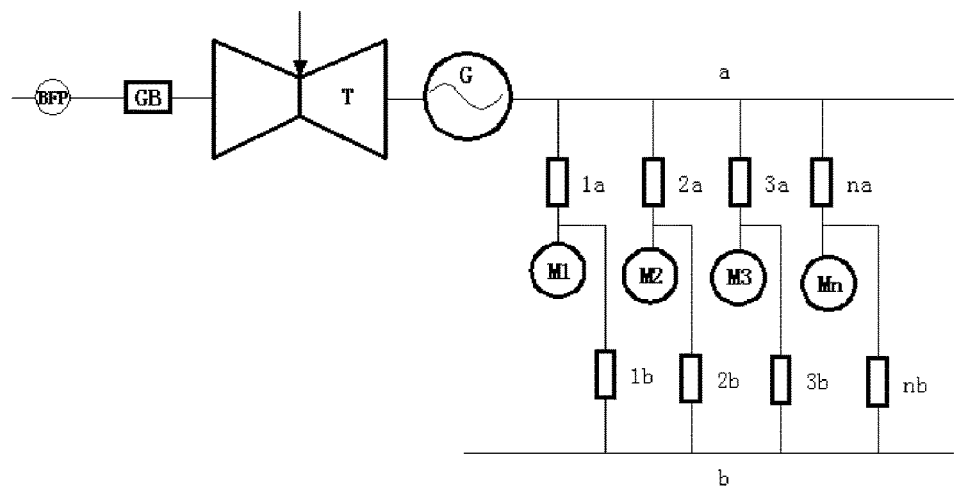
FIG. 1, FIG. 2, FIG. 3, FIG. 4 and FIG. 5 are schematic diagrams of systems according to specific embodiments of the present invention.

As illustrated in FIG. 1, it illustrates a specific embodiment of a generalized frequency conversion system for a steam turbine generator unit of the present invention. The system comprises a variable speed steam turbine T, a water feeding pump BFP, a variable frequency generator G, a speed increasing gearbox GB with a fixed rotating speed ratio, a variable frequency bus a and an industrial frequency bus b. Auxiliary machines $M_1$, $M_2$, $M_3$ ... $M_n$ are connected to the variable frequency bus a through switches 1a, 2a, 3a, ..., na, and are connected to the industrial frequency bus b through switches 1b, 2b, 3b, ..., nb. With a change in load of the unit, parameters of steam entering the variable speed steam turbine and an extracted steam amount are adjusted (changed) accordingly, so that the rotating speed of the steam turbine changes accordingly. In this way, on one hand, the rotating speed of the water feeding pump is changed indirectly through the gearbox; and on the other hand, the frequency of alternating current outputted by the variable frequency generator is changed directly. The variable frequency generator provides a variable frequency power supply for all auxiliary machines connected to the variable frequency bus a. The industrial frequency bus b and the variable frequency bus a may be switched to each other for a standby use. When the variable speed steam turbine or the variable frequency generator fails or is under other special working conditions, all auxiliary machines on the variable frequency bus a can switch to the industrial frequency bus b quickly, thus ensuring the safe operation of the main steam turbine generator unit.

In this solution, the variable speed steam turbine can choose longer last-stage blades because of its low rotating speed relative to the water feeding pump steam turbine with a high rotating speed, so as to obtain a more adequate exhaust area and thus obtain a lower exhaust pressure. Taking a 53 MW variable speed steam turbine as an example, the exhaust pressure is relatively reduced by 2.4 KPa, and the variable speed steam turbine can therefore do more work by 3360 KW.

Embodiment 2

Figure 2:
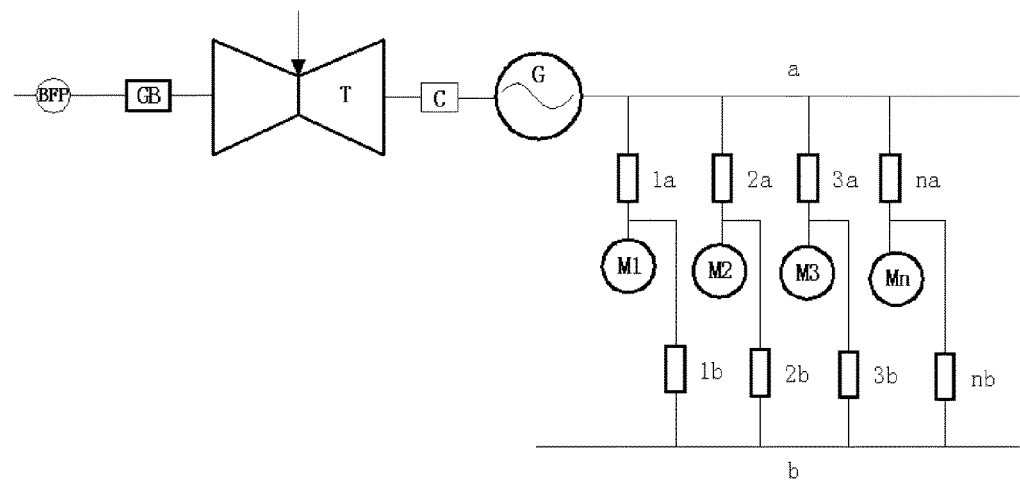

As illustrated in FIG. 2, it illustrates another specific embodiment of a generalized frequency conversion system for a steam turbine generator unit of the present invention. The system comprises a variable speed steam turbine T, a water feeding pump BFP, a variable frequency generator G, a speed increasing gearbox GB with a fixed rotating speed ratio, a clutch system C, a variable frequency bus a and an industrial frequency bus b Auxiliary machines $M_1$, $M_2$, $M_3$ ... $M_n$ are connected to the variable frequency bus a through switches 1a, 2a, 3a, ..., na, and are connected to the industrial frequency bus b through switches 1b, 2b, 3b, ..., nb. With a change in load of the unit, parameters of steam entering the steam turbine and an extracted steam amount are adjusted (changed) accordingly, so that the rotating speed of the steam turbine changes accordingly. In this way, on one hand, the rotating speed of the water feeding pump is changed indirectly through the gearbox; and on the other hand, the frequency of alternating current outputted by the variable frequency generator is changed directly. The variable frequency generator provides a variable frequency power supply for all auxiliary machines connected to the variable frequency bus a. The industrial frequency bus b and the variable frequency bus a may be switched to each other for a standby use. When the variable speed steam turbine or the variable frequency generator fails or is under other special working conditions, auxiliary machines on the variable frequency bus a can switch to the industrial frequency bus b quickly, thus ensuring the safe operation of the main steam turbine generator unit.

Compared with Embodiment 1, in this embodiment, the clutch system C is additionally arranged. If an abnormal working condition (such as when the variable frequency generator or its electrical equipment fails and thus it is required that the variable frequency generator must be shut down) occurs, the variable frequency generator can be disconnected directly through the clutch system, and instead, the steam turbine operates and drives the water feeding pump only. The reliability of the entire generalized frequency conversion system and the main steam turbine generator unit is improved.

Embodiment 3

Figure 3:
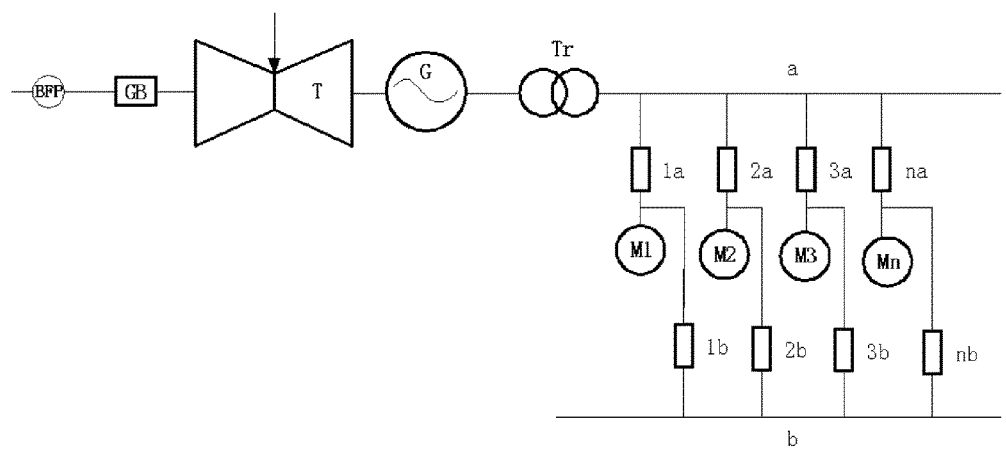

As illustrated in FIG. 3, it illustrates another specific embodiment of a generalized frequency conversion system for a steam turbine generator unit of the present invention. The system comprises a variable speed steam turbine T, a water feeding pump BFP, a variable frequency generator G, a speed increasing gearbox GB with a fixed rotating speed ratio, a dual-winding voltage transformer Tr, a variable frequency bus a and an industrial frequency bus b. Auxiliary machines $M_1$, $M_2$, $M_3$ ... $M_n$ are connected to the variable frequency bus a through switches 1a, 2a, 3a, ..., na, and are connected to the industrial frequency bus b through switches 1b, 2b, 3b ..., nb. With a change in load of the unit, parameters of steam entering the variable speed steam turbine and an extracted steam amount are adjusted (changed) accordingly, so that the rotating speed of the steam turbine changes accordingly. In this way, on one hand, the rotating speed of the water feeding pump is changed indirectly through the gearbox; and on the other hand, the frequency of alternating current outputted by the variable frequency generator is changed directly. The variable frequency generator provides a variable frequency power supply for all auxiliary machines connected to the variable frequency bus a. The industrial frequency bus b and the variable frequency bus a may be switched to each other for a standby use. When the variable speed steam turbine or the variable frequency generator fails or is under other special working conditions, auxiliary machines on the variable frequency bus a can switch to the industrial frequency bus b quickly, thus ensuring safety.

Compared with Embodiment 1, in this embodiment, the dual-winding voltage transformer Tr is additionally arranged, so that the output voltage of the variable frequency generator, after voltage transformation, can meet the requirements of motors of all auxiliary machines at the same voltage level.

Embodiment 4

Figure 4:
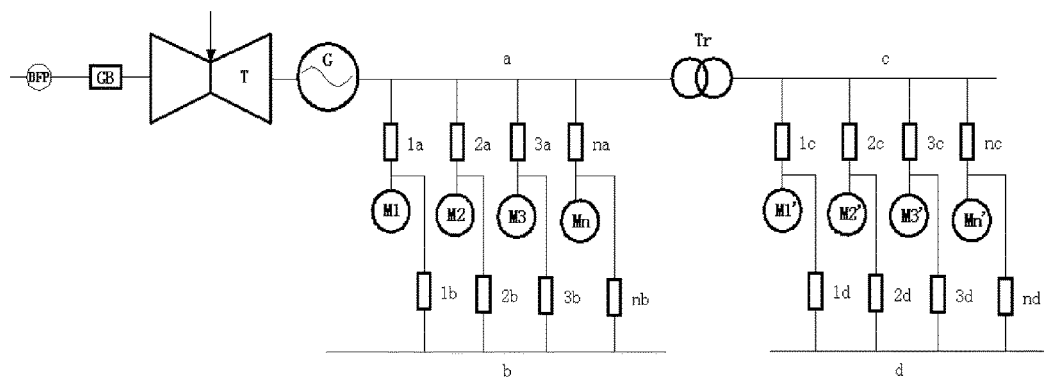

As illustrated in FIG. 4, it illustrates another specific embodiment of a generalized frequency conversion system for a steam turbine generator unit of the present invention. The system comprises a variable speed steam turbine T, a water feeding pump BFP, a variable frequency generator G, a speed increasing gearbox GB with a fixed rotating speed ratio, a dual-winding voltage transformer Tr, a variable frequency bus a, an industrial frequency bus b, a variable frequency bus c and an industrial frequency bus d. Auxiliary machines $M_1, M_2, M_3 \ldots M_n$ are connected to the variable frequency bus a through switches $1a, 2a, 3a, \ldots$, na, and are connected to the industrial frequency bus b through switches $1b, 2b, 3b, \ldots$, nb; and auxiliary machines $M_1', M_2', M_3', \ldots M_n'$ are connected to the variable frequency bus c through switches $1c, 2c, 3c, \ldots$, nc, and are connected to the industrial frequency bus d through switches $1d, 2d, 3d, \ldots$, nd. With a change in load of the unit, parameters of steam entering the variable speed steam turbine and an extracted steam amount are adjusted (changed) accordingly, so that the rotating speed of the steam turbine changes accordingly. In this way, on one hand, the rotating speed of the water feeding pump is changed indirectly through the gearbox; and on the other hand, the frequency of alternating current outputted by the variable frequency generator is changed directly. The variable frequency generator provides a variable frequency power supply for all auxiliary machines connected to the variable frequency bus a. The industrial frequency bus b and the variable frequency bus a may be switched to each other for a standby use. At the same time, through the dual-winding voltage transformer Tr, a variable frequency power supply is provided for all auxiliary machines on the variable frequency bus c at different voltage levels. The industrial frequency bus d and the variable frequency bus c may be switched to each other for a standby use.

When the variable speed steam turbine or the variable frequency generator fails or is under other special working conditions, auxiliary machines on the variable frequency bus a can switch to the industrial frequency bus b quickly, and at the same time auxiliary machines on the variable frequency bus c can switch to the industrial frequency bus d quickly, thus ensuring the safe operation of the main steam turbine generator unit.

Compared with Embodiment 1, in this embodiment, the output voltage of the variable frequency generator can not only meet the voltage requirements of part of motors of auxiliary machines directly, but also meet the requirements of motors of auxiliary machines at other voltage levels after the voltage is transformed by the dual-winding voltage transformer Tr.

Embodiment 5

Figure 5:
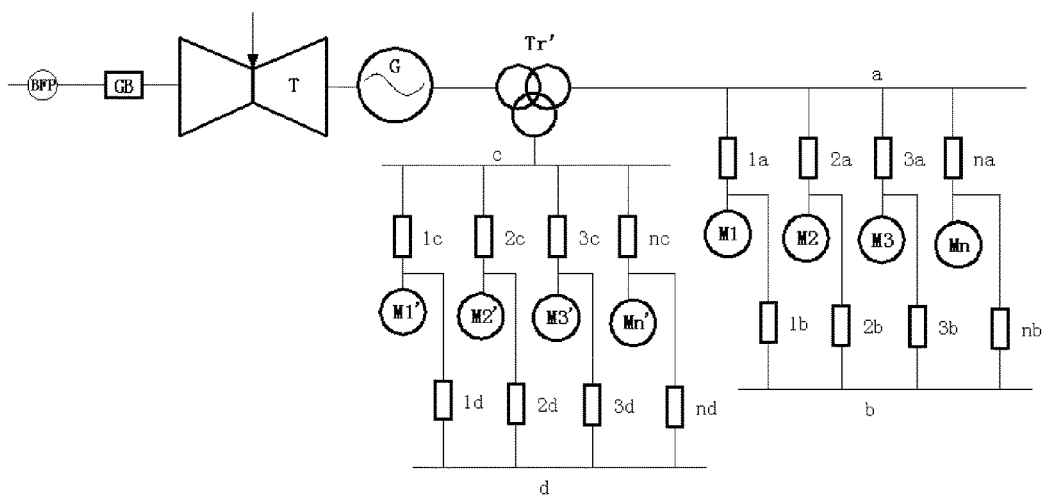
Figure 6:
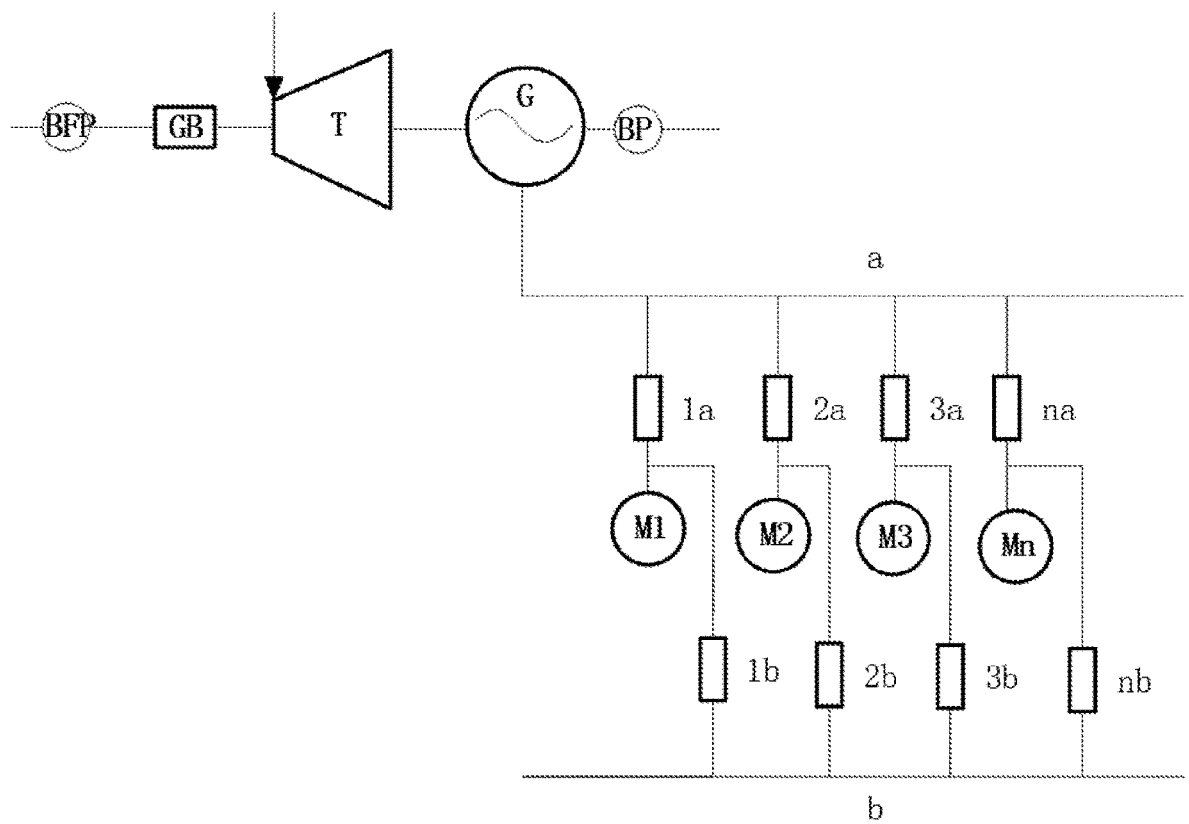
FIG. 6, FIG. 7, FIG. 8, FIG. 9, FIG. 10 are schematic diagrams of systems in which a front pump is connected on the basis of the embodiments of FIG. 1, FIG. 2, FIG. 3, FIG. 4, and FIG. 5 according to the present invention.
Figure 7:
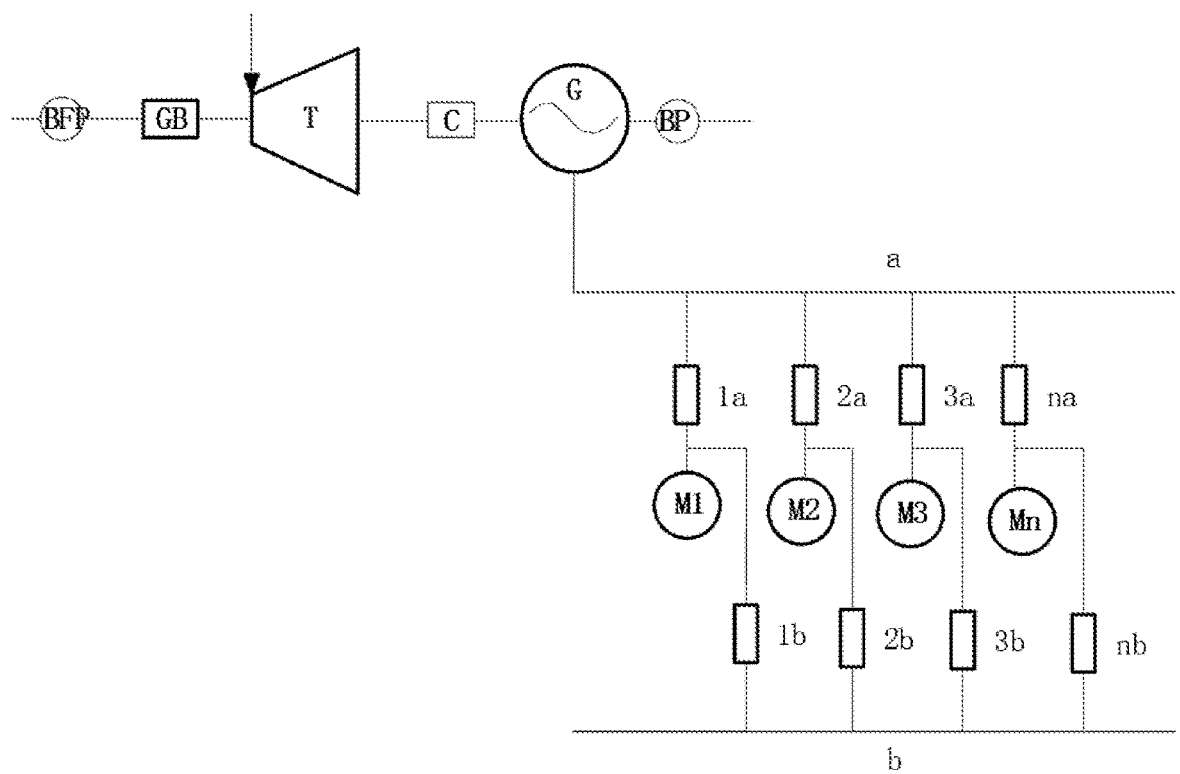
Figure 8:
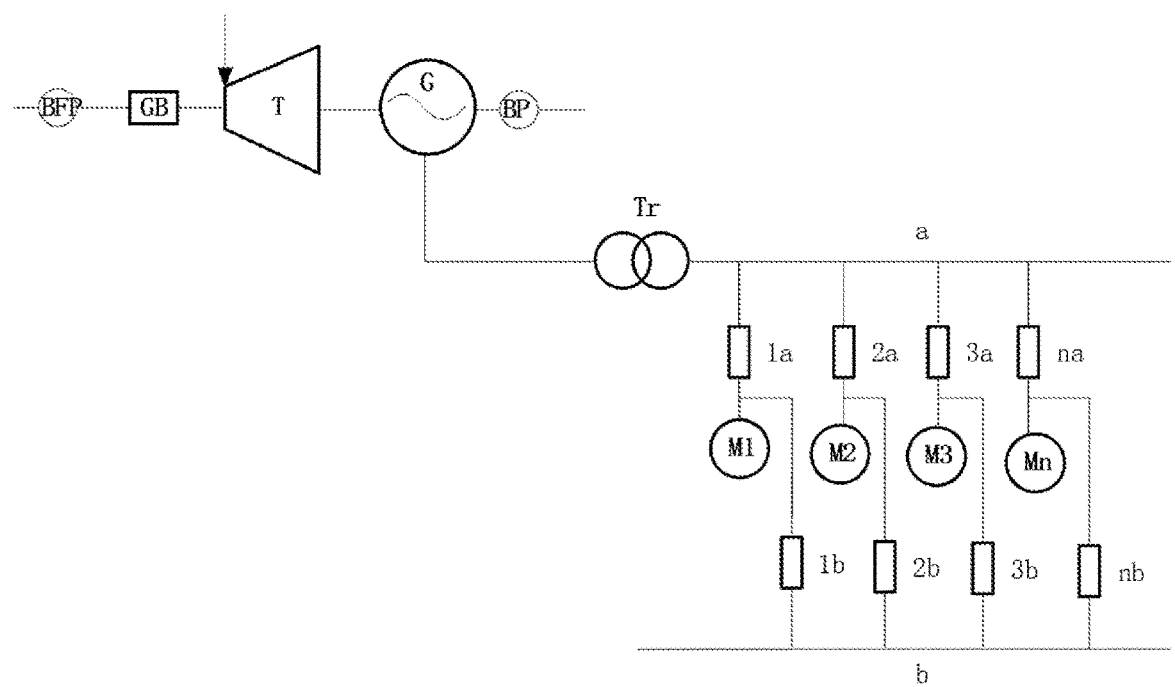
Figure 9:
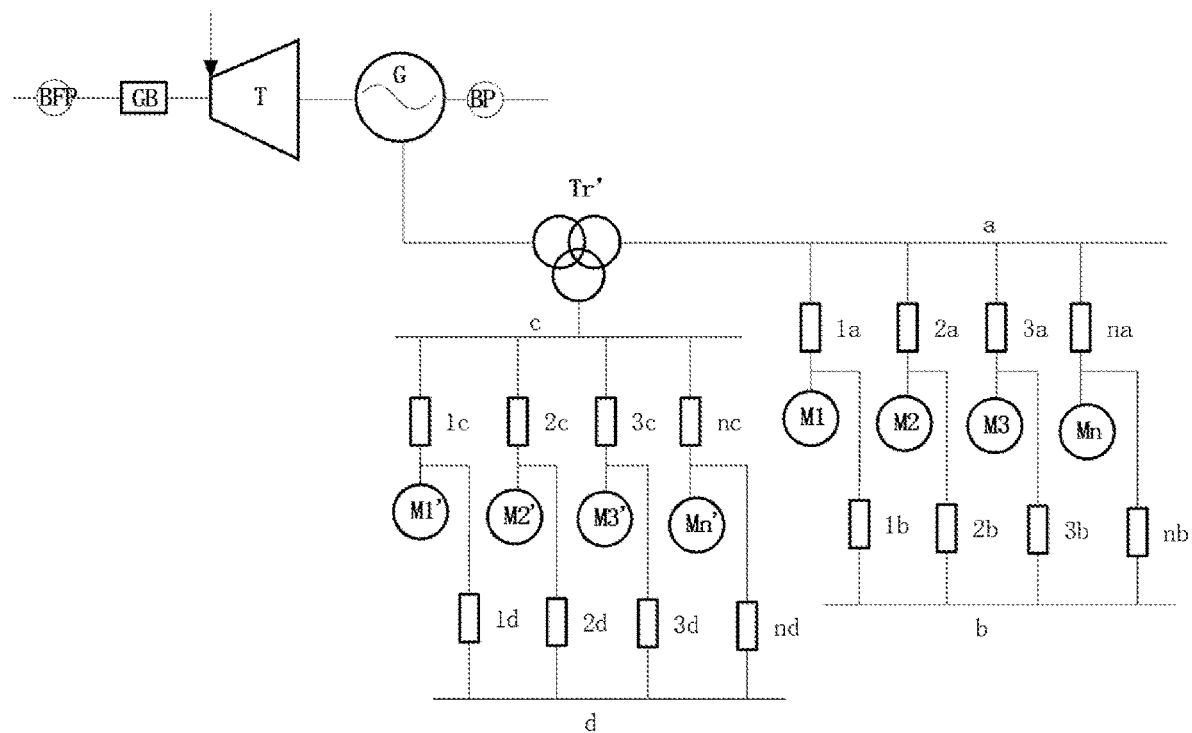
Figure 10:
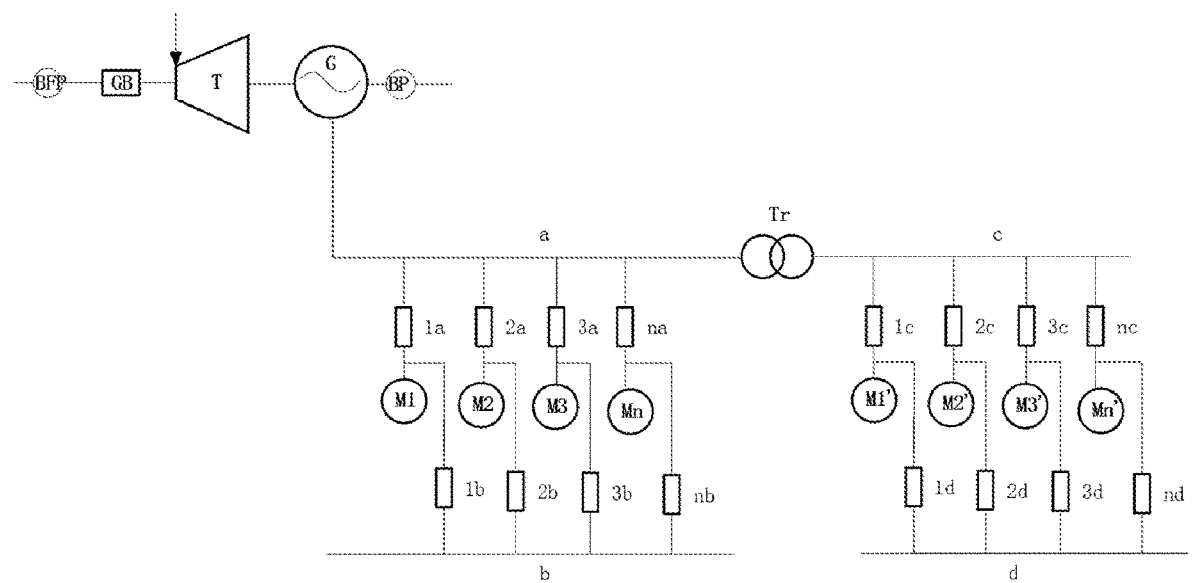

As illustrated in FIG. 5, it illustrates another specific embodiment of a generalized frequency conversion system for a steam turbine generator unit of the present invention. The system comprises a variable speed steam turbine T, a water feeding pump BFP, a variable frequency generator G, a speed increasing gearbox GB with a fixed rotating speed ratio, a three-winding transformer Tr', a variable frequency bus a, an industrial frequency bus b, a variable frequency bus c and an industrial frequency bus d. Auxiliary machines $M_1, M_2, M_3 \ldots M_n$ are connected to the variable frequency bus a through switches $1a, 2a, 3a, \ldots$, na, and are connected to the industrial frequency bus b through switches $1b, 2b, 3b \ldots$, nb; and auxiliary machines $M_1', M_2', M_3' \ldots M_n'$ are connected to the variable frequency bus c through switches $1c, 2c, 3c, \ldots$, nc, and are connected to the industrial frequency bus d through switches $1d, 2d, 3d, \ldots$, nd. With a change in load of the unit, parameters of steam entering the variable speed steam turbine and an extracted steam amount are adjusted (changed) accordingly, so that the rotating speed of the steam turbine changes accordingly. In this way, on one hand, the rotating speed of the water feeding pump is changed indirectly through the gearbox; and on the other hand, the frequency of alternating current outputted by the variable frequency generator is changed directly. The variable frequency generator provides a variable frequency power supply for all auxiliary machines connected to the variable frequency bus a. The industrial frequency bus b and the variable frequency bus a may be switched to each other for a standby use. At the same time, through the dual-winding voltage transformer Tr, a variable frequency power supply is provided for all auxiliary machines on the variable frequency bus c at different voltage levels. The industrial frequency bus d and the variable frequency bus c may be switched to each other for a standby use.

When the variable speed steam turbine or the variable frequency generator fails or is under other special working conditions, auxiliary machines on the variable frequency bus a can switch to the industrial frequency bus b quickly, and at the same time auxiliary machines on the variable frequency bus c can switch to the industrial frequency bus d quickly, thus ensuring the safe operation of the main steam turbine generator unit.

Compared with Embodiment 1, in this embodiment, the output voltage of the variable frequency generator is transformed by the three-winding transformer Tr'; and then a variable frequency power supply is provided for motors of auxiliary machines at two different voltage levels through the variable frequency buses a and c respectively.

It should be noted that in the above-mentioned embodiments of the present invention, the dual-winding voltage transformer Tr, the three-winding voltage transformer Tr' and the clutch system C can be combined into a variety of embodiments, but all of them should fall within the protective scope of the present invention patent.

Embodiment 6

As illustrated in FIG. 6, FIG. 7, FIG. 8, FIG. 9, and FIG. 10, further specific embodiments of a generalized frequency conversion system for a steam turbine generator of the present invention are illustrated respectively on the basis of Embodiments 1-5, with an addition of a front pump BP. As illustrated in FIGS. 1-5, one end of the variable speed steam turbine T is directly connected to the water feeding pump BFP through the speed increasing gearbox GB with a fixed rotating speed ratio, the other end is connected to the variable frequency generator G, and the front pump BP is connected to the variable frequency generator G. As for the connection manner of the clutch system C, the dual-winding voltage transformer Tr, the three-winding voltage transformer Tr', the variable frequency bus a, the industrial frequency bus b, the variable frequency bus c, the industrial frequency bus d and the variable frequency generator G, it is still the same as that described in a corresponding one of Embodiments 1-5, which will not be repeated herein. By providing the front pump BP, variable rotating speed operation of the front pump can be realized without using any types of electronic power frequency converters. Mechanical driving is used in the front pump BP, which itself is highly reliable, so it can avoid problems, brought by a conventional "driving the front pump at an industrial frequency" mode, such as low operating efficiency under low load condition and high risk of electrical failure caused by industrial frequency driving itself. In addition, compared with a traditional shaft system in which a front pump and a steam turbine are connected (which uses a high-rotating-speed steam turbine, so that the front pump cannot be directly connected to the high-rotating-speed steam turbine, and a gearbox with a fixed rotating speed ratio is required), because a variable speed steam turbine with a low rotating speed is used, the front pump can be directly connected to the variable speed steam turbine and the variable frequency generator. There is no need to use a reduction gearbox, which not only saves the investment in the gearbox itself, but also avoids the efficiency loss of the gearbox itself, thus improving the economy of the unit. It should be noted that, in this example, the front pump is arranged at a non-driving end of the variable frequency generator, rather than between the variable speed steam turbine and the variable frequency generator. The advantage of this arrangement is that the power of the front pump is transmitted by the variable frequency generator. For the variable frequency generator, its existing design and manufacturing process can fully meet the requirements of transmitting the power of the front pump; however, if the front pump is arranged between the variable speed steam turbine and the variable frequency generator, the power of the variable frequency generator needs to be transmitted by the front pump, which places high requirements on the manufacturing process of the front pump and will greatly increase the cost of the front pump, which is even more difficult to achieve.

The specific embodiments of the present invention are described in detail as above. It should be understood that a person of ordinary skill in the art would be able to make various modifications and variations according to the concept of the present invention without involving any inventive effort. Therefore, any technical solution that can be obtained by a person skilled in the art by means of logical analysis, reasoning or limited trials on the basis of the prior art and according to the concept of the present invention should be included within the scope of protection of the claims.

The invention claimed is:

1. A generalized frequency conversion system for a steam turbine generator unit, comprising a variable speed steam turbine with an adjustable rotating speed, a water feeding pump, a variable frequency generator operating at a variable speed, a speed increasing gearbox with a fixed rotating speed ratio, a variable frequency bus and an auxiliary machine; wherein the variable speed steam turbine is connected to the water feeding pump through the speed increasing gearbox to drive the water feeding pump; the variable speed steam turbine is connected to the variable frequency generator to drive the variable frequency generator to generate power; and the variable frequency generator is connected to a motor of the auxiliary machine through the variable frequency bus;

wherein the generalized frequency conversion system further comprises a front pump which is directly connected to the variable frequency generator, so that there is no gearbox arranged between the front pump and the variable speed steam turbine.

2. The generalized frequency conversion system of claim 1, wherein the generalized frequency conversion system further comprises an industrial frequency bus and an industrial frequency power supply, wherein the motor of the auxiliary machine is connected to the industrial frequency power supply through the industrial frequency bus.

3. The generalized frequency conversion system of claim 1, wherein the generalized frequency conversion system further comprises a clutch system arranged between the variable speed steam turbine and the variable frequency generator.

4. The generalized frequency conversion system of claim 3, wherein the clutch system is a separate safety coupling, or a separate clutch or a combination of a safety coupling and a clutch.

5. The generalized frequency conversion system of claim 1, wherein the generalized frequency conversion system further comprises a voltage transformer, wherein the voltage transformer is arranged at the rear of an output end of the variable frequency generator and is connected to the motor of the auxiliary machine through the variable frequency bus.

6. The generalized frequency conversion system of claim 1, wherein the generalized frequency conversion system further comprises a first switch, a second switch and an industrial frequency bus, wherein the motor of the auxiliary machine is connected to the variable frequency bus through the first switch; and the motor of the auxiliary machine is connected to the industrial frequency bus through the second switch.

7. The generalized frequency conversion system of claim 1, wherein the number of the auxiliary machines is at least one.

* * * * *